United States Patent [19]
Furuya

[11] Patent Number: 5,577,087
[45] Date of Patent: Nov. 19, 1996

[54] VARIABLE MODULATION COMMUNICATION METHOD AND SYSTEM

[75] Inventor: Yukitsuna Furuya, Tokyo, Japan

[73] Assignee: NEC Corporation, Tokyo, Japan

[21] Appl. No.: 967,278

[22] Filed: Oct. 27, 1992

[30] Foreign Application Priority Data

Oct. 31, 1991 [JP] Japan ................... 3-286064

[51] Int. Cl.$^6$ ................................. H04J 3/00
[52] U.S. Cl. ................. 375/377; 375/222; 375/259; 455/226.2
[58] Field of Search ............... 375/39, 17, 67, 375/83, 102, 84, 261, 260, 264, 267, 279, 283, 286, 298, 317, 299, 329, 332, 334, 333, 324, 340, 346, 347, 349, 40; 370/85.7, 17, 79, 95; 329/304, 306; 455/277.2, 226.1–226.4; 371/20.1, 32, 33, 34, 56, 55; 332/103, 104

[56] References Cited

U.S. PATENT DOCUMENTS

| | | | |
|---|---|---|---|
| 3,911,395 | 10/1975 | Koike | 371/283 |
| 4,571,735 | 2/1986 | Furse | 375/283 X |
| 4,697,265 | 9/1987 | Nozve | 375/224 X |
| 5,081,666 | 1/1992 | Blaschek et al. | 375/224 X |

OTHER PUBLICATIONS

Gardner, C. R., "A Hybrid Simulation Incorporating; Multiple Modulation Techniques," Proceedings of the 1985 Summer Computer Simulation Conf. Jul. 22–24, 1985 pp. 284–289.

"Procedure for G3 Document Facsimile Transmission in the General Switched Telephone Network Incorporating Error Correction", CCITT IXth Plenary Assembly, Melbourne, Nov. 1988, vol. VII, Fascicle VII. 3, pp. 119–131.

*Primary Examiner*—Young T. Tse
*Assistant Examiner*—Bryan Webster
*Attorney, Agent, or Firm*—Foley & Lardner

[57] ABSTRACT

In a variable modulation communication method, the transmission quality of a transmission path is monitored. If the transmission quality is good, communication is performed while the transmission time is shortened by using a multilevel modulation scheme. If the transmission quality is bad, communication is performed while the transmission time is prolonged by using a modulation scheme having a smaller number of levels than the multilevel modulation scheme. A variable modulation communication apparatus is also disclosed.

10 Claims, 3 Drawing Sheets

16QAM

QPSK

VARIABLE MODULATION COMMUNICATION METHOD AND SYSTEM

BACKGROUND OF THE INVENTION

The present invention relates to a variable modulation communication method and apparatus such a digital radio communication system accommodating a plurality of terminals.

In the conventional radio communication systems, a modulation scheme is fixed for each system, and cannot be changed regardless of the state of a transmission path. For example, digital automobile telephone units in Japan and the Unites States employ a quaternary modulation scheme called π/4 shift QPSK (Quadrature Phase Shift Keying), which is invariably used regardless of the conditions. In order to improve the frequency utilization efficiency, a multilevel modulation scheme such as a 16QAM (Quadrature Amplitude Modulation) scheme may be used. If, however, such a scheme is used, the system becomes susceptible to noise, and hence the service area is narrowed.

A method of ensuring a service area by switching modulation schemes depending on the state of a transmission path has already been employed by a telephone modem used for a facsimile apparatus or the like. According to the method, when a transmission path is in a normal state, data is transmitted at 9,600 bps by 16QAM modulation. If a transmission path is in a bad state, however, the number of multivalue levels in modulation is sequentially decreased to 4 and then to 2 in order to maintain the communication quality, thereby transmitting data at only 4,800 bps or 2,400 bps respectively. As described above, the method of variably setting modulation schemes has already been put into practice in communication systems which allow controlled variation in transmission rate of information between users, such as a facsimile system and or a data communication system. However, the method has not yet been employed in communication systems which demand a constant information transmission rate, such as a telephone system, because conventional methods of switching modulation schemes causes a change in transmission rate.

In the conventional communication method, since a constant modulation scheme is used regardless of reception power, if the signal power is strong, the frequency utilization efficiency cannot be improved.

In addition, if modulation schemes are switched when a transmission path is in a bad state, the transmission rate is inevitably decreased. In order to prevent this, a method of increasing the symbol rate in transmission may be employed. For example, the amount of information which can be transmitted can be substantially kept constant by doubling the symbol rate instead of decreasing the number of multivalue levels in modulation from 16 to 4. In this method, however, the filter system and other equipment must be replaced, resulting in difficulty in configuring the hardware. In addition, in radio communication, changes to the occupied bandwidth cause interference with other systems. Therefore a problem is posed in terms of radio regulation.

SUMMARY OF THE INVENTION

It is an object of the present invention to provide a variable modulation communication method and apparatus which can ensure a constant information transmission rate.

It is another object of the present invention to provide a variable modulation communication method and apparatus which improve frequency utilization.

It is still another object of the present invention to provide a variable modulation communication method and apparatus which can cover a wide service area.

In order to achieve the above objects, according to the present invention, there is provided a variable modulation communication method comprising the steps of monitoring the transmission quality of a transmission path, and communicating with a shortened transmission time via a multilevel modulation scheme if the transmission quality is good, and communicating with a lengthened transmission time via a modulation scheme having a smaller number of levels than the multilevel modulation scheme if the transmission quality is bad.

In addition, according to the present invention, there is provided a variable modulation communication apparatus comprising first modulation means for performing multilevel modulation of digital data, second modulation means for performing modulation with fewer levels than those in the first modulation means, TDMA control means for performing time slot allocation differently depending on whether the first or second modulation means is selected, and performing time-division multiplexing communication control by using predetermined time slots which are allocated more in number when the second modulation means is selected than when the first modulation means is selected, switch means for selectively switching time-division output data from the TDMA control section to output the data to the first and second modulation means, and control means for controlling the switch means and the TDMA control means on the basis of a modulation scheme designated by a base station.

DESCRIPTION OF THE PREFERRED EMBODIMENT

Figure 1A:
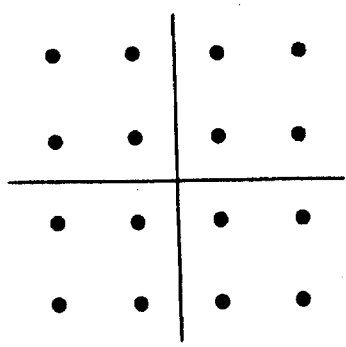
FIGS. 1A and 1B are charts respectively showing the data point arrangements of modulation schemes according to an embodiment of the present invention.
Figure 1B:
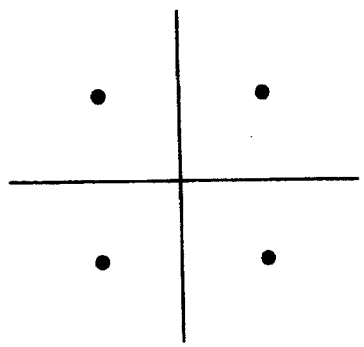
Figure 2:
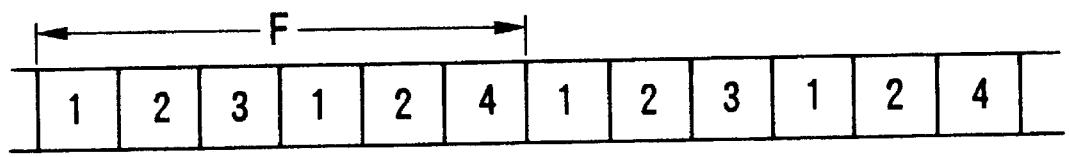
FIG. 2 is a view showing an example of channel allocation in the embodiment of the present invention.
Figure 3:
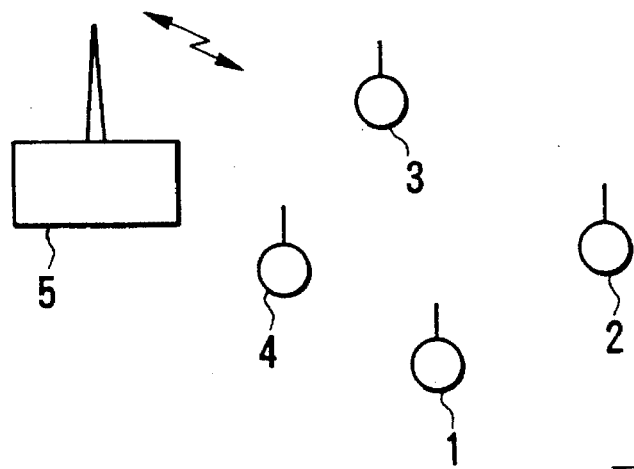
FIG. 3 is a view showing an arrangement of a base station and terminals of a system used in the present invention.

FIGS. 1A and 1B show an embodiment of the present invention. FIGS. 1A and 1B show data point arrangements in modulation schemes used in the present invention, i.e., 16QAM carrying 4 bits per symbol and QPSK carrying 2 bits per symbol. FIG. 2 shows a time-division multiplexing method in the present invention. FIG. 3 shows an arrangement of a base station and terminals of a system used in the present invention.

Referring to FIG. 3, terminals 1, 2, 3, and 4 perform communication with a base station 5. Assume that the terminals 1 and 2 are located far away from the base station 5, while the terminals 3 and 4 are located close to the base station 5. As shown in FIGS. 1A and 1B, the distances between data points are much wider with QPSK than with 16QAM. Therefore, QPSK can be used under much nosier conditions than 16QAM. Therefore, the base station 5 uses QPSK as a quaternary modulation scheme to communicate with terminals 1 and 2, and uses 16QAM as a 16 level modulation scheme to communicate with terminals 3 and 4. These terminals transmit signals upon time-division multiplexing, as shown in FIG. 2. Since the information transmission capacity of 16QAM is twice that of QPSK, the number of time slots for time-division multiplexing which are allocated to a terminal using QPSK is twice that allocated to a terminal using 16QAM. Referring to FIG. 2, time slots are allocated to the terminals 1 and 2 once for every three slots, whereas time slots are allocated to the terminals 3 and 4 once for every six slots. That is, time slot allocation is performed twice with respect to the terminals 1 and 2, and once with respect to the terminals 3 and 4 within one frame F. With this operation, the terminals located close to the base station use a multilevel modulation scheme, while the terminals located far away from the base station use a modulation scheme with a smaller number of multivalue levels, thereby realizing the same information transmission rate. If communication between all these terminals and the base station is performed by QPSK, only three terminals can perform communication at the same time. It is, therefore, apparent that the frequency utilization efficiency is improved by the present invention. In addition, if all communications are to be performed by 16QAM, communication services cannot be provided for the terminals 1 and 2. FIGS. 1A and 1B express the amplitudes and phases which transmission symbols can take in 16QAM and QPSK, respectively, on two-dimensional planes.

Figure 4:
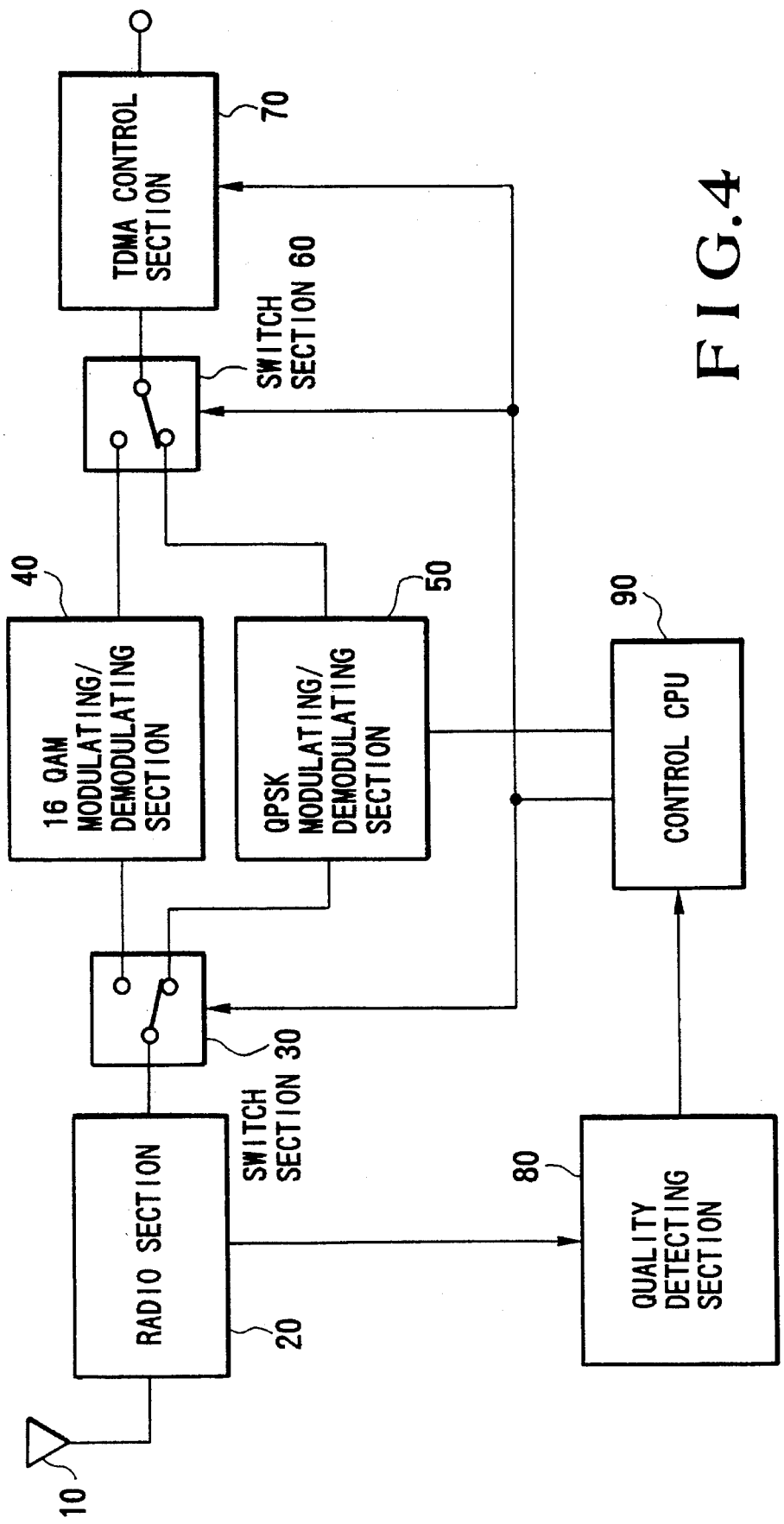
FIG. 4 is a block diagram showing an arrangement of a terminal incorporating a variable modulation communication apparatus of the present invention.

FIG. 4 shows the arrangement of a terminal incorporating a variable modulation communication apparatus according to the present invention. Referring to FIG. 4, reference numeral 10 denotes an antenna for transmitting/receiving radio signals to/from the base station; 20, a radio section for inputting/outputting transmission/reception signals to/from the antenna 10; 40, a 16QAM modulating/demodulating section for performing modulation/demodulation by 16QAM; 50, a QPSK modulating/demodulating section for performing modulation/demodulation by QPSK; 30 and 60, switch sections for switching the 16QAM modulating/demodulating section 40 and the QPSK modulating/demodulating section 50; 70, a TDMA (Time Division Multiple Access) control section for performing TDMA control using predetermined time slots; 80, a quality detecting section for detecting the quality of a reception signal on the basis of an output from the radio section 20; and 90, a control CPU for inputting/outputting data to/from the quality detecting section 80 and the QPSK modulating/demodulating section 50 and controlling the switch sections 30 and 60 and the TDMA control section 70.

Figure 5:
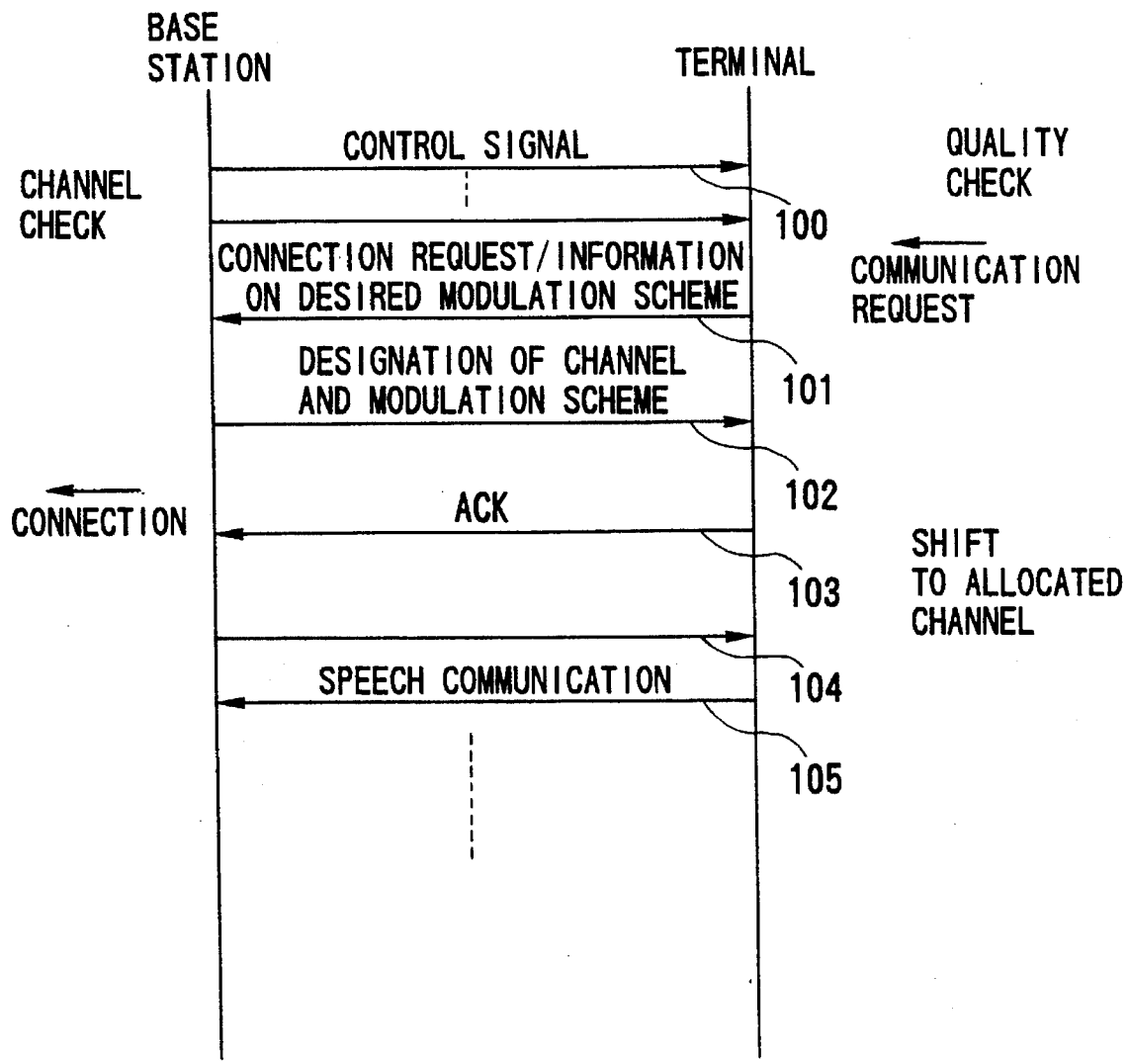
FIG. 5 is a chart showing a modulation scheme selection sequence in FIG. 4.

An operation of the terminal having the above-described arrangement will be described below with reference to FIG. 5, which shows a modulation scheme selection sequence.

During idle time the terminal receives a control signal 100 from the base station through the antenna 10 and converts it into a baseband signal through the radio section 20. The quality detecting section 80 checks the quality of the reception signal on the basis of reception signal power from the radio section 20. When a user generates a communication request by, e.g., depressing a transmission button (not shown), the terminal supplies a connection request signal to the base station together with information about a desired modulation scheme (101) on the basis of the quality checked by the quality detecting section 80 under the control of the control CPU 90. More specifically, if the average reception signal level exceeds a certain preset value, the terminal requests 16QAM as a modulation scheme. If the level is lower than the preset value, the terminal requests communication based on QPSK as a modulation scheme. The threshold level should be set high enough so that 16QAM is selected only when the instantaneous signal drop due to fading or shadowing will not degrade performance to an unacceptable level. Such a control signal is transmitted/received through the QPSK modulating/demodulating section 50 having high reliability. The base station checks the quality of the reception signal to determine whether communication can be performed by the desired modulation scheme. At the same time, the base station searches for a free channel, and designates a channel and a modulation scheme (102). If 16QAM is used, time slot allocation is performed once for every six slots by using the 16QAM modulating/demodulating section 40, as shown in FIG. 2. If QPSK is used, time slot allocation is performed once for every three slots by using the QPSK modulating/demodulating section 50. The terminal receives a control channel through the QPSK modulating/demodulating section 50, and sends an acknowledgement ACK 103 to the base station. At the same time, the terminal shifts to the designated channel to start communication (104, 105). At this time, the control CPU 90 controls the switch sections 30 and 60 and the TDMA control section 70 to switch to one of the modulating/demodulating sections 40 and 50 in accordance with the designated modulation/demodulation scheme and to switch time slot allocation methods. Modulation is performed by the selected one of the modulating/demodulating sections 40 and 50. In this configuration, the switches stay at the same position for the duration of the conversation. Therefore, even if the terminal moves, a single modulation scheme corresponding to the initial current state of the terminal is used throughout the conversation. When the communication is initiated from the base station, the paging signal is provided on the control signal 100, and the modulation method is determined through the same process.

In an alternative configuration, the quality detecting section 80 is designed to detect a change in state of the terminal during communication. Therefore, upon movement, modulation schemes can be switched during communication.

As has been described in detail above, according to the present invention, there is provided a radio communication method and apparatus which can achieve high frequency utilization efficiency and ensure a wide service area by switching modulation schemes in accordance with the state of a terminal.

What is claimed is:

1. A variable modulation communication method comprising the steps of:

monitoring the transmission quality of a transmission path; and selecting a shortened transmission time using a multilevel modulation scheme if the transmission quality of the transmission path exceeds a preset threshold, and selecting a lengthened transmission time using a modulation scheme having a smaller number of levels if the transmission quality of the transmission path is below said preset threshold.

2. A method according to claim 1, wherein a QAM modulation scheme is used as the first multilevel modulation scheme, and a PSK modulation scheme is used as the second multilevel modulation scheme having the smaller number of levels.

3. A method according to claim 1, wherein a plurality of terminals are arranged for performing time-division multiplexing communication with a base station upon time slot allocation, and fewer time slots are allocated to a terminal using the first multilevel modulation scheme than to a terminal using the second multilevel modulation scheme having the smaller number of levels.

4. A method according to claim 3, wherein said terminal using the first multilevel modulation scheme is allocated one time slot within a frame, and said terminal using the second multilevel modulation scheme having the smaller number of levels is allocated a plurality of time slots within said frame.

5. A variable modulation communication apparatus comprising:

first modulation means for performing multilevel modulation of digital data;

second modulation means for performing modulation of digital data with fewer levels than said first modulation means;

monitor means for monitoring transmission quality of a transmission path in order to determine a modulation scheme, said modulation scheme being carried out by one of said first and said second modulation means;

TDMA control means for performing time slot allocation differently depending on whether said first or second modulation means is used to carry out said modulation scheme, and performing time-division multiplexing communication control by using predetermined time slots which are allocated more in number when said second modulation means is used to carry out said modulation scheme than when said first modulation means is used to carry out said modulation scheme, thereby obtaining an identical information communication rate regardless of whether said first or said second modulation means is used;

switch means for selectively switching time-division output data from said TDMA control means to output the data to said first and said second modulation means; and control means for controlling said switch means and said TDMA control means on the basis of said modulation scheme determined by said transmission quality monitored by said monitor means to selectively enable said first or said second modulation means.

6. A variable modulation communication method comprising the steps of:

transmitting a control signal from a base station to a terminal by using a first multilevel modulation scheme;

receiving said control signal by said terminal and monitoring a transmission quality of said control signal on a transmission path on a basis of a power of said control signal received;

determining, based on the monitored transmission quality, whether to use said first multilevel modulation scheme or a second multilevel modulation scheme having a larger number of levels than said first multilevel modulation scheme;

transmitting a connection request signal from said terminal to said base station on a basis of a communication request made by a user at said terminal, said connection request signal including information on the determined one of said first and second multilevel modulation schemes;

receiving said connection request signal at said base station and checking a reception quality of said connection request signal at said base station;

determining, at said base station, whether said determined one of said first and second multilevel modulation schemes can be performed for communication between said base station and said terminal based on said reception quality of said connection request signal;

at a same time as the determining step is performed at said base station, searching at said base station for a free communication channel and a modulation scheme;

determining a communication channel and modulation scheme for the communication between said base station and said terminal based on the searching step;

sending, from said base station to said terminal, a communication signal which includes information related to said communication channel and modulation scheme for communication between said base station and said terminal;

receiving said communication signal at said terminal and sending an acknowledgement signal from said terminal to said base station; and at a same time as said terminal sends said acknowledgement signal, shifting a communication channel for transmission and reception of information at said terminal to said communication channel included in said communication signal, selecting a modulation scheme for the transmission and reception of information at said terminal in accordance with said modulation scheme included in said communication signal, and setting up time slots for the transmission and reception of information at said terminal in accordance with said modulation scheme included in said communication signal.

7. An apparatus according to claim 5, wherein said monitor means, which is arranged in a terminal, sends a request for the modulation scheme to a base station, said control means controls said switch means and said TDMA control means on the basis of the modulation scheme which is designated by said base station in accordance with a power level of a received signal from said terminal.

8. An apparatus according to claim 7, wherein a QAM modulation scheme is used by said first modulation means for performing said multilevel modulation of digital data and a PSK modulation scheme is used by said second modulation means for performing said modulation of digital data with fewer levels.

9. An apparatus according to claim 7, wherein a plurality of terminals are arranged for performing time-division multiplexing communication with said base station upon time slot allocation, and fewer time slots are allocated to one of said plurality of terminals having said modulation scheme carried out by said first modulation means than to another of said plurality of terminals having said modulation scheme carried out by said second modulation means.

10. An apparatus according to claim 7, wherein one of the plurality of terminals having said modulation scheme carried out by said first modulation means is allocated one time slot within a frame, and another of said plurality of terminals having said modulation scheme carried out by said second modulation means is allocated a plurality of time slots within said frame.

* * * * *